Aug. 29, 1967   M. P. GOLDEN   3,338,080
FORMING APPARATUS
Filed Sept. 21, 1964
7 Sheets-Sheet 1
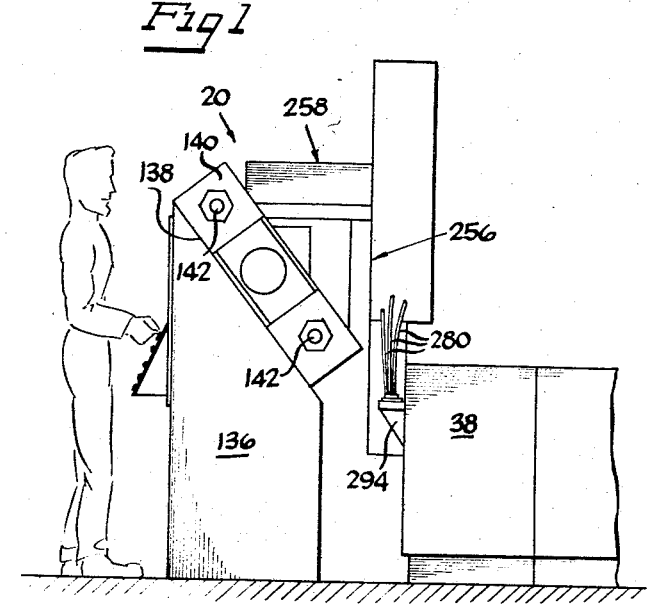
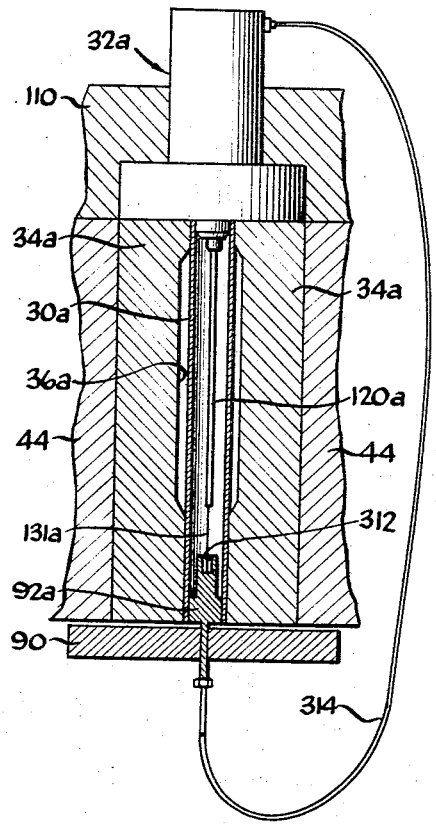
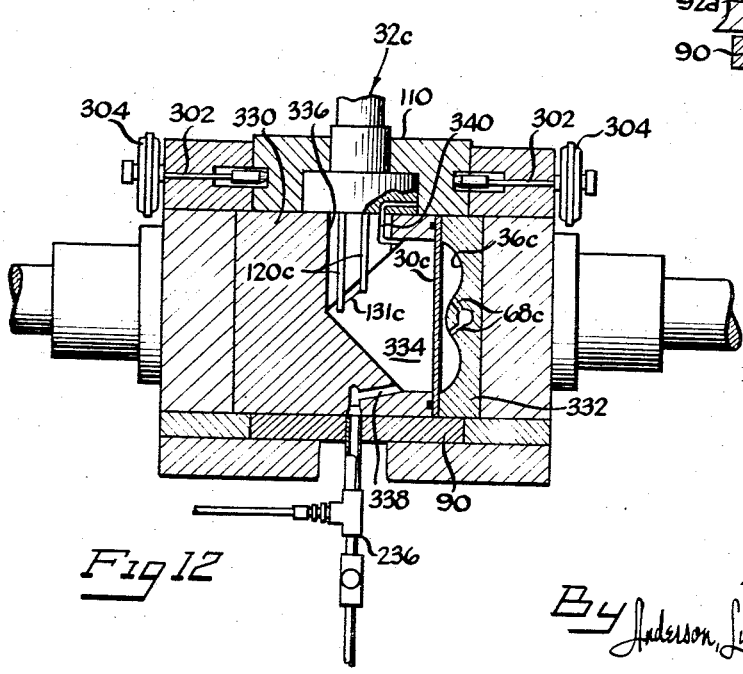
Inventor
Martin P. Golden
By Anderson, Luedeka, Fitch, Even & Tabin
Atty's

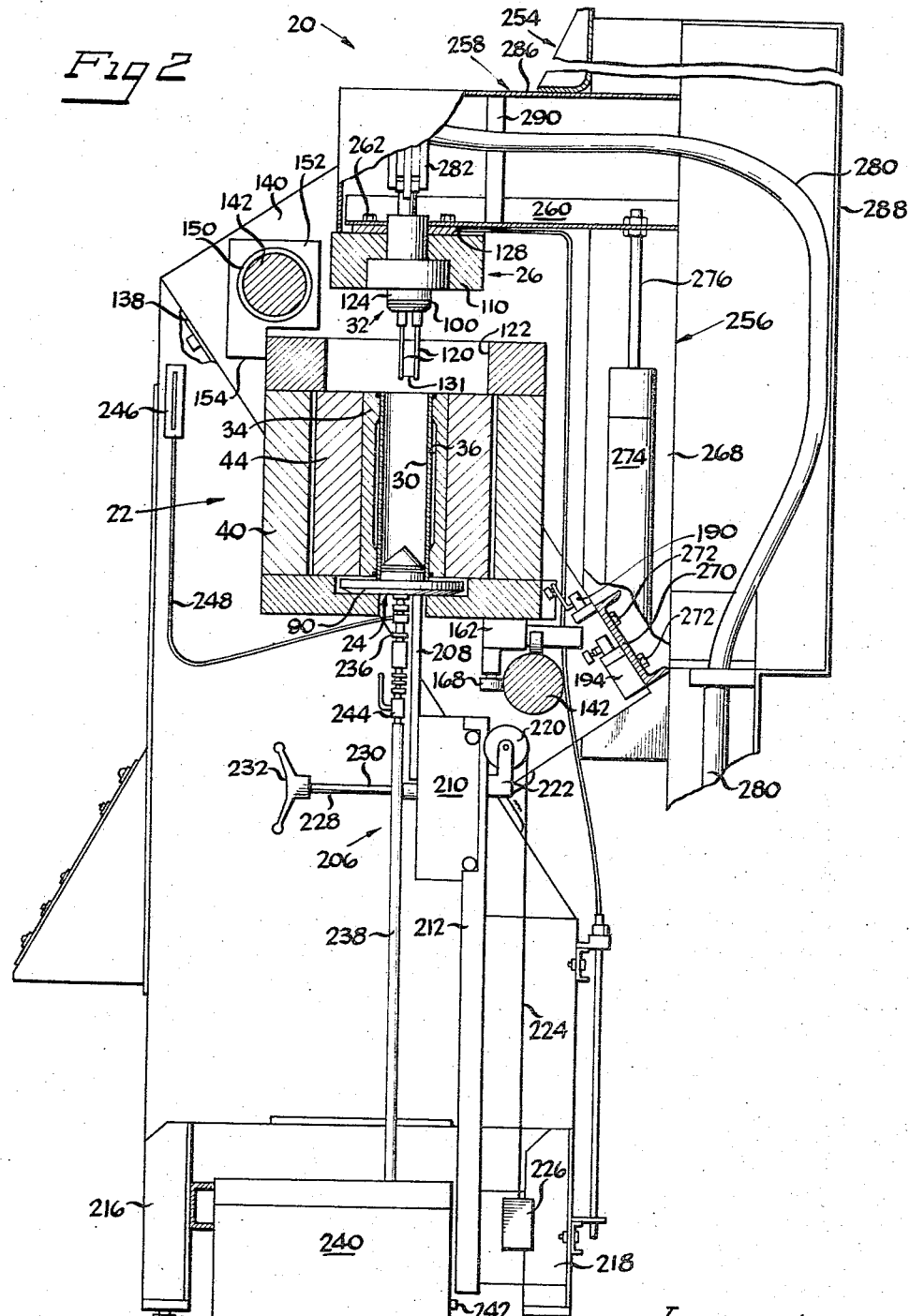

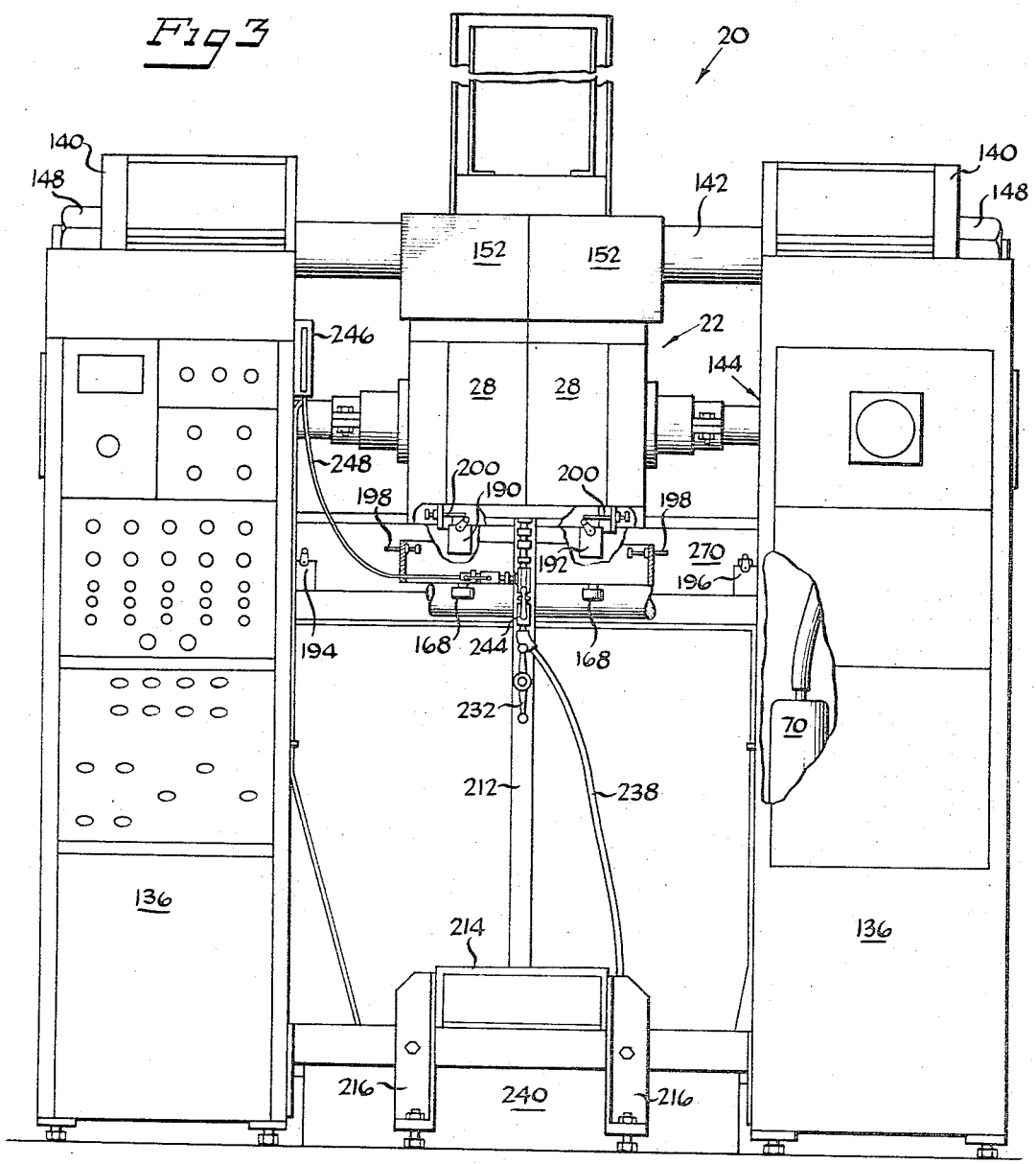

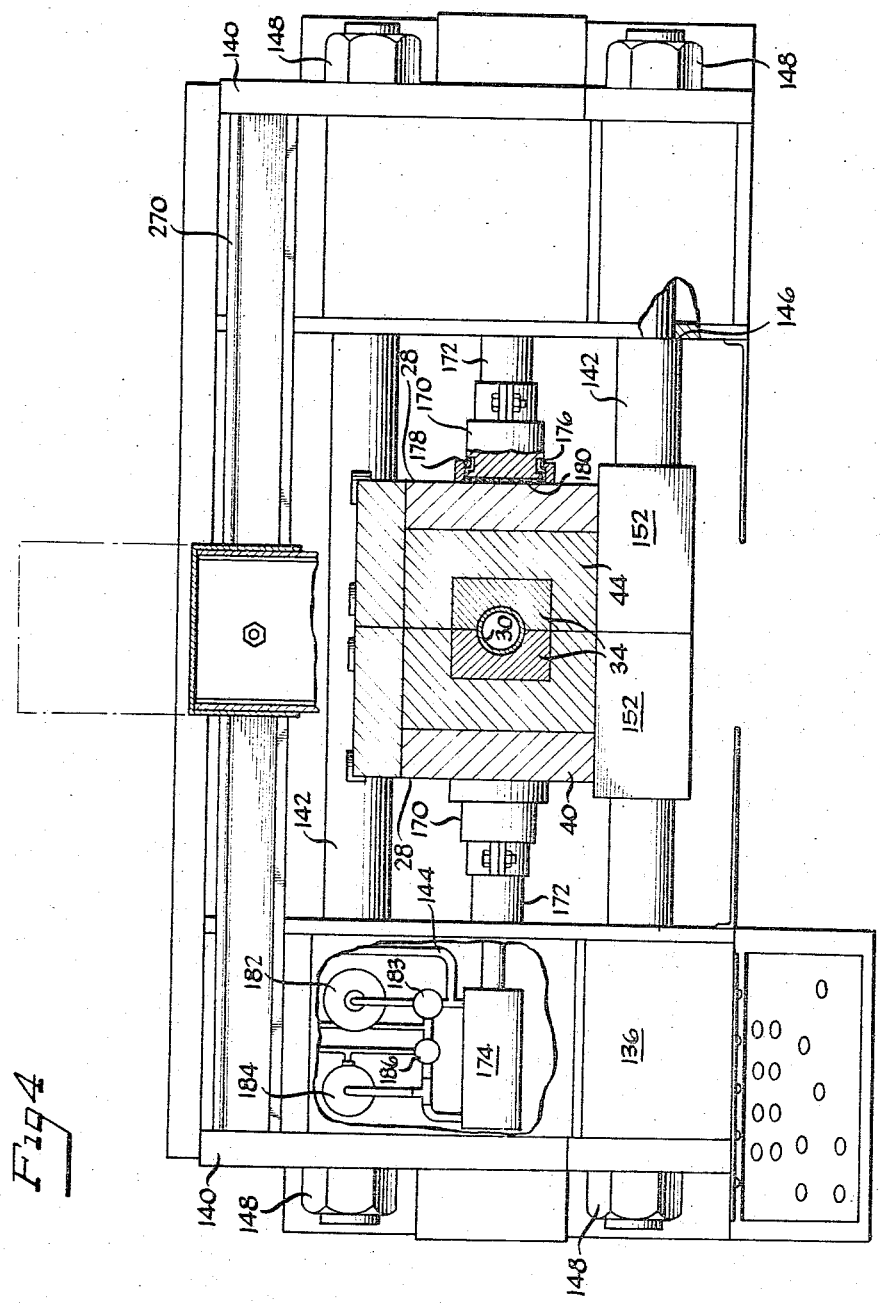

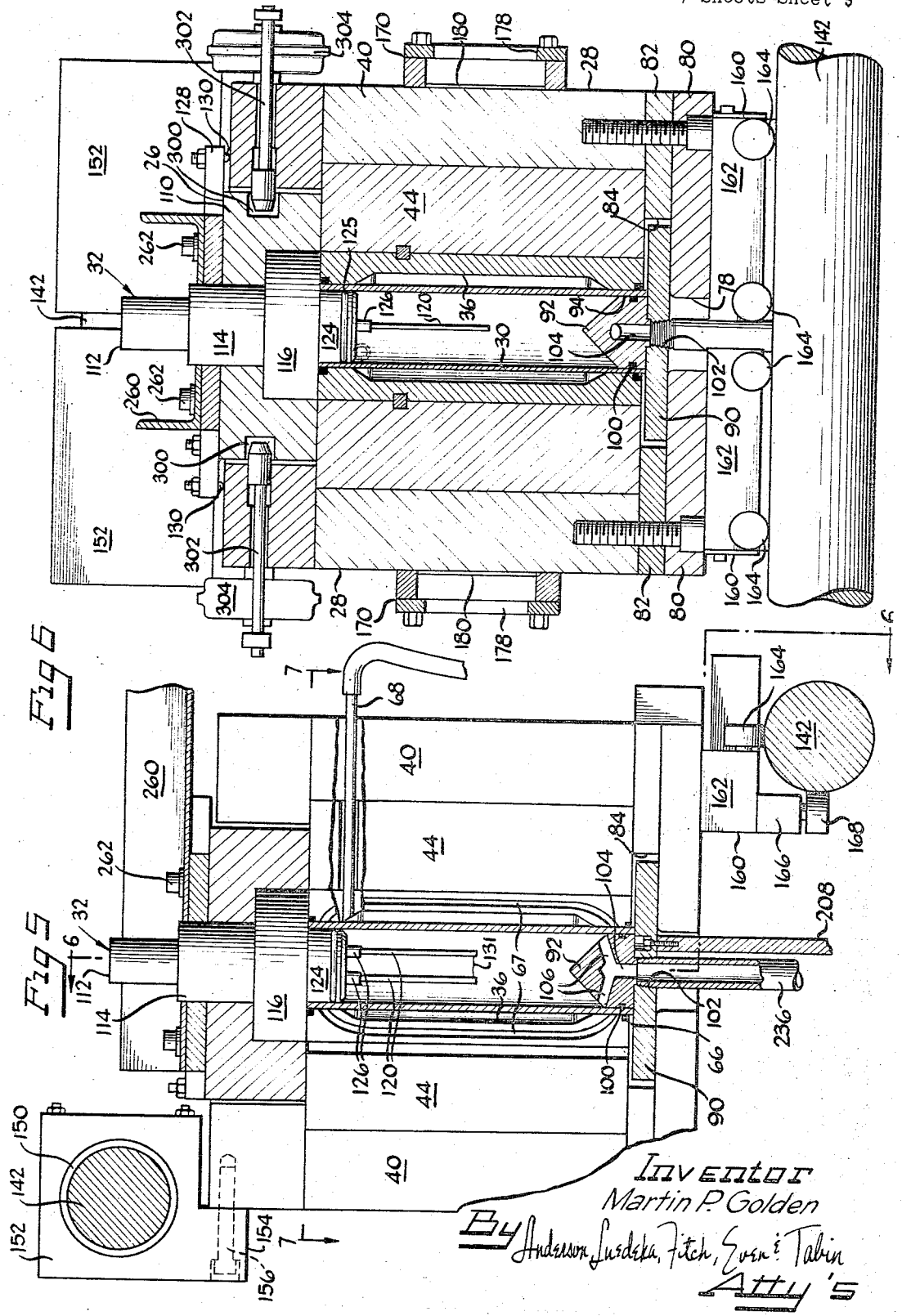

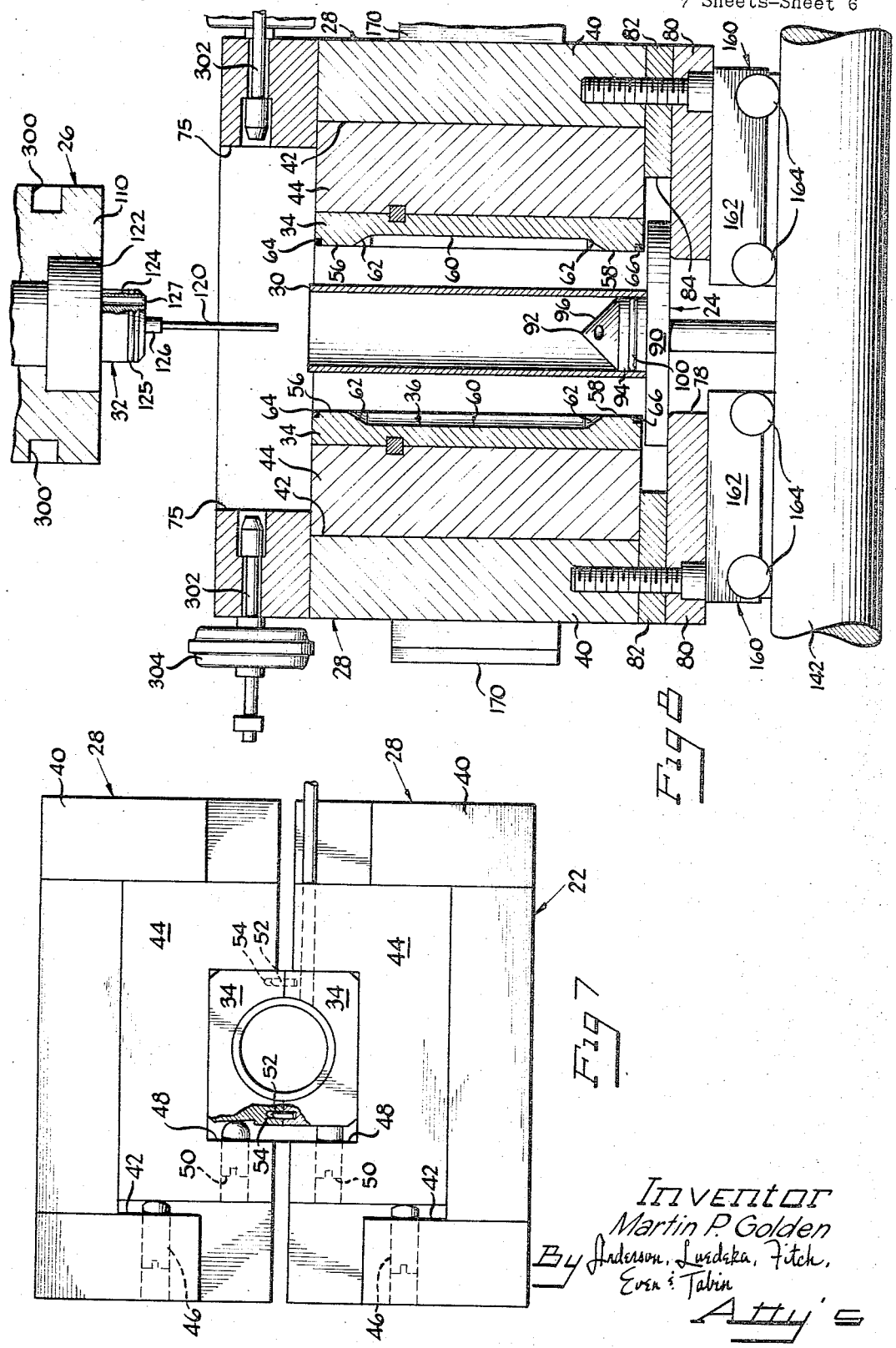

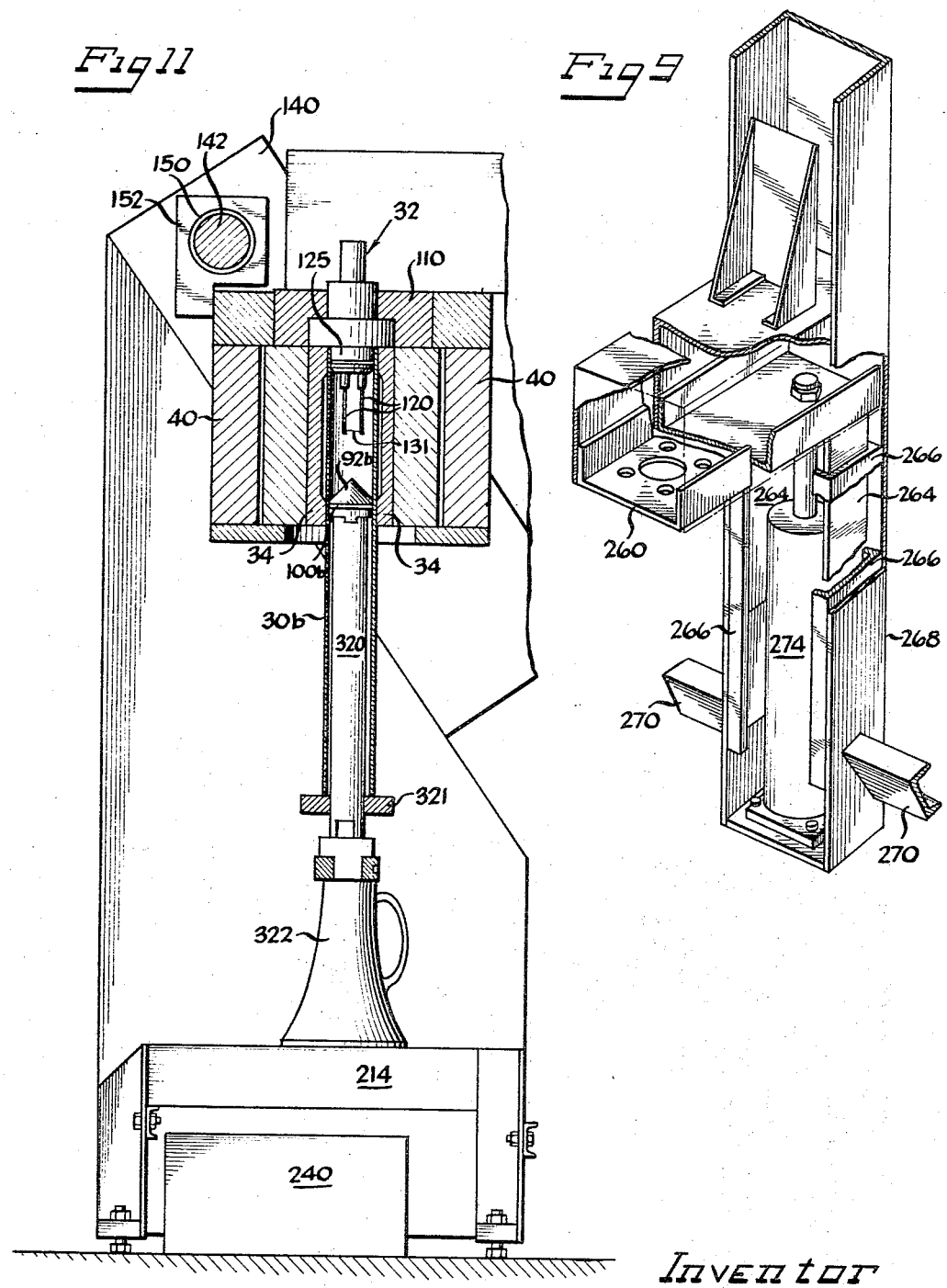

United States Patent Office 3,338,080
Patented Aug. 29, 1967

3,338,080
FORMING APPARATUS
Martin P. Golden, Del Mar, Calif., assignor to General Dynamics Corporation, New York, N.Y., a corporation of Delaware
Filed Sept. 21, 1964, Ser. No. 397,737
13 Claims. (Cl. 72—56)

ABSTRACT OF THE DISCLOSURE

Apparatus for electrohydraulic forming utilizing a pair of movable mating die sections. For forming tubular workpieces, upper and lower assemblies are utilized. The lower assembly carries a tubular workpiece into the die region whereas the upper assembly seals the upper end of tubular workpiece and carries the electrode head. After completion of the forming operation, withdrawal of the four interengaging units provides ready access for removal of the formed workpiece and for readying the apparatus for the next forming operation.

---

The present invention relates generally to apparatus for electrohydraulic forming and more particularly to apparatus for positioning and supporting a die and a workpiece for rapid and accurate forming of the workpiece by electrohydraulic forming.

In electrohydraulic forming, a high energy electrical discharge is created within a fluid medium, such as water, to cause shock waves therein. The workpiece to be formed is positioned so as to be impinged by the shock waves and thereby formed into a desired shape or configuration. To control the dimensions and configuration of the article being formed, the workpiece is normally formed into a die cavity.

This method is particularly useful in forming hollow-body shapes from generally tubular workpieces. For example, electrical discharge means may be inserted within a tubular workpiece, the ends of which are otherwise sealed. The workpiece is filled with a liquid, and a die is placed around the workpiece. When a high energy electrical discharge is produced in the liquid within the workpiece, the workpiece is displaced outwardly into the die cavity.

A die suitable for formation of a tubular workpiece is generally made of separable die sections to permit ready access to the die cavity for ready loading and unloading of the workpiece. Accordingly, it is important that any separation or realignment of the die sections, which might be produced by the energy discharge, should be kept to a minimum. An appreciable gap between die sections may result in the production of a die or separation line in the formed product. Because the forces created in electrohydraulic forming can be quite large, a considerable problem can be presented.

A flat workpiece may also be formed by edectrohydraulic forming. In such an instance, the flat workpiece is generally supported along its periphery with one side of the workpiece facing a die cavity and with the other side disposed in a chamber filled with liquid. The energy release through electrical discharge means disposed in the liquid causes the workpiece to be deformed into the die and take the shape of the die cavity. To produce a precise product in an operation of this type, the periphery of the workpiece should be firmly anchored to avoid slipping or shifting of the workpiece relative to the die.

Apparatus for electrohydraulic forming of a workpiece is desired wherein the workpiece is automatically and securely positioned in a precise location relative to the die and to the electrical discharge means. Apparatus which is readily adaptable to form flat as well as tubular workpieces is also desired.

It is a principal object of the present invention to provide novel apparatus for electrohydraulic forming.

Another object is to provide apparatus for electrohydraulic forming which quickly and accurately reproduces formed articles with a high degree of conformity to the shape of the die cavity of the machine.

Still another object is the provision of such an apparatus which can accommodate a die construction including four interengaging die assemblies.

A further object is to provide such apparatus which automatically positions a workpiece relative to a die cavity and to electrical discharge means.

A still further object is the provision of such apparatus which closes and clamps together the sections of the die with unequal forces to ensure precise location of the die in its reference position.

Yet another object is to provide apparatus which clamps die sections together in such a manner that very large forces created by electrohydraulic forming produce virtually no separation or relative movement either between the die sections themselves or between the die sections and the workpiece.

Still another object is to provide apparatus for electrohydraulic forming which provides ready access to the interior of the die.

Yet still another object is to provide such apparatus which is adapted to form workpieces of various configurations and sizes. In this connection, it is a more specific object to provide apparatus readily adaptable to form flat as well as tubular workpieces and to form fairly long workpieces.

A still further object is to provide simple and relatively inexpensive apparatus for electrohydraulic forming which is also strong, durable and dependable in operation.

Yet another object is to provide such apparatus which incorporates ample safety features for the protection of the operator.

Other objects and advantages of the present invention will become more apparent from the following description and the accompanying drawings, wherein:

FIGURE 1 is a right side elevational view of electrohydraulic forming apparatus including a die construction which apparatus embodies various features of the present invention;

FIGURE 2 is an enlarged right side elevational view of the apparatus shown in FIGURE 1, with parts broken away and in section to reveal various details of construction, the die construction being in a partially open condition;

FIGURE 3 is an enlarged front view of the apparatus shown in FIGURE 1, with various parts broken away;

FIGURE 4 is a plan view of the apparatus shown in FIGURE 3, with various parts removed and in section;

FIGURE 5 is a fragmentary enlarged side sectional view of the apparatus illustrated in FIGURE 1, showing the die construction in its closed position;

FIGURE 6 is a front sectional view taken generally along the line 6—6 of FIGURE 5;

FIGURE 7 is a top sectional view taken generally along line 7—7 of FIGURE 5;

FIGURE 8 is a front sectional view similar to FIGURE 6, with the die construction shown in a partially open condition;

FIGURE 9 is a fragmentary perspective view, with parts removed, of a portion of the apparatus of FIGURE 1;

FIGURE 10 is a fragmentary side sectional view showing the apparatus adapted to form a small diameter tubular workpiece;

FIGURE 11 is a right side view similar to FIGURE 2, showing the apparatus adapted for forming operation upon a long tubular workpiece; and FIGURE 12 is a diagrammatic front view of a die construction adapted to form a generally flat workpiece.

Briefly, an apparatus 20 for electrohydraulic forming is illustrated which embodies various features of the present invention. The apparatus 20 includes a readily accessible die construction 22 formed by four interengaging die assemblies or parts: a lower die assembly 24, an upper die assembly 26, and a pair of opposed side die assemblies 28. When the apparatus is adapted, as shown in FIGURES 2 through 8, to form a short tubular workpiece 30, the lower die assembly 24 supports the workpiece from below in vertical disposition and the upper die assembly 26 supports an electrode unit 32 which serves as an electrical discharge means. The upper die assemblies 26 may be moved to position the electrode unit 32 within the tubular workpiece 30.

The side die assemblies 28, which each include a die section or half 34, are moved hydraulically to unite the die sections 34 and form a die around the workpiece 30. The die sections 34 are recessed as desired to create a die cavity 36 outward of the workpiece. The upper and lower die assemblies 26 and 24 seal both ends of the tubular workpiece 30 so that a liquid, usually water, may be introduced into the interior of the workpiece. An energy storage unit 38, disposed rearward of the die construction 22, provides sufficient energy to create a controlled high-voltage discharge at the electrode unit 32 interior of the workpiece 30. The energy of the discharge transmitted through the liquid as a shock wave deforms the tubular workpiece 30 outward into the die cavity 36.

The illustrated apparatus 20 positions the workpiece 30 in the desired location relative to the die cavity 36 and to the electrode unit 32. The side die assemblies 28 are clamped together with intense supplemental pressure without disturbing the relative locations of the die cavity 36, the workpiece 30 and the electrode unit 32. Clamping is accomplished in such a manner that the large forces created by the high-voltage discharge produce substantially no separation or displacement of the die sections 34 relative to each other or to the workpiece 30. The illustrated apparatus 20 is readily adaptable for electrohydraulic forming of a small diameter tubular workpiece 30a (FIGURE 10), a relatively long workpiece 30b (FIGURE 11), or a generally flat workpiece 30c (FIGURE 12).

It should be understood that the apparatus 20 is capable of performing various operations on a workpiece, such as forming, trimming, piercing, embossing and drawing. For the sake of brevity and to avoid repetition, the description is limited to forming operations. Moreover, although the apparatus 20 is capable of forming products in a great variety of sizes and shapes, explanation is simplified by limiting the description to the forming of several generally representative products which are considered adequate to disclose the operation of the apparatus 20.

Workpieces of any suitable deformable material, such as metal, may be formed by the apparatus 20. In this connection, the illustrated apparatus 20 satisfactorily forms some metals, such as stainless steel and Hastelloy, which are normally difficult to form.

The die construction 22 for forming the short tubular workpiece 30 is shown best in FIGURES 5 through 8. The side die assemblies 28 include die holders 40 that have facing box-like cavities 42 in which die inserts 44 are removably secured, as by set screws 46 (FIGURE 7). The die inserts 44 similarly have facing cavities 48 in which the die sections 34 are removably secured as by set screws 50. For tubular workpieces 30, larger than about 4 inches in cross section, a suitable pair of larger die sections (not shown) may be secured directly in the die holders 40 without the use of die inserts 44.

The sections 34 are horizontally movable to close or meet along a vertical mating or parting plane which extends front to back centrally of the apparatus 20. The recess in each die section 34 provides one-half of the die cavity 36, defined by the closed die sections. One die section 34 includes suitable aligning pins 52 (FIG. 7), while the other is provided with mating holes 54 for receiving the pins. The pins 52 and holes 54 position the die sections 34 relative to one another locking them in position against displacement in directions transverse or normal to their direction of movement.

The illustrated die sections 34 include upper and lower end portions 56 and 58 that define lateral surface portions of a right circular cylinder and an enlarged intermediate portion 60. The central portion 60, into which deformation of the workpiece 30 takes place, also defines the lateral surface of a right circular cylinder which is connected by curved annular surfaces 62 at each end to the end portions 56 and 58.

The thickness of each die section 34 is greater than the depth of the cavity 48 so that a portion of each die section overhangs the inward edge of its insert. This arrangement permits direct and unobstructed abutment between the two die sections 34 when the side die assemblies 28 are closed. The die holders 40 and the die inserts 44 of the respective side die assemblies 28 remain slightly separated, permitting concentration of the clamping force on the two die sections.

The die construction 22 is provided with means for sealing and evacuating the toroidal space between the closed die sections 34 and outer surface of the tubular workpiece 30. Each die section 34 is provided with a pair of semicircular gaskets or O-ring segments, an upper segment 64 and a lower segment 66. The upper O-ring segment 64 is positioned at the periphery or rim of the upper end of the die cavity 36, while the lower O-ring segment 66 is located at the periphery or rim of the lower end of the cavity. When the two die sections 34 are clamped together, the ends of the upper and lower O-ring segments of each die section abut those of the opposite section, thereby forming continuous circumferential seals between the tubular workpiece 30 and the die sections 34 at both ends of the die cavity 36. Planar sealing strips or gaskets 67 (see FIG. 5) are provided on both mating surfaces of each die section 34. When the die sections 34 are closed, the segments 67 abut and create a seal therebetween. A pipe or conduit 68, extending through the right-hand die section 34, the associated die insert 44, and the associated die holder 40, is connected to a vacuum pump 70 housed in a side cabinet member 136 (FIGURE 3) and is adapted to evacuate the toroidal space.

The illustrated die holders 40 interengage with the upper die assembly 26 and the lower die assembly 24, when the die construction 22 is closed. More particularly, the upper wall of each die holder 40 is cut away to provide a centered upper receptacle 75 (see FIG. 8) which provides access to the upper ends of the die sections 35 and the die cavity 36. The upper receptacle 75 receives the upper die assembly 26 when the die construction 22 is closed. The lower wall of each die holder 40 is also centrally cut away to provide a centered lower receptacle 78 that receives the lower die assembly 24.

The lower wall of each die holder includes a retaining plate 80 which is lowermost and which is secured to the underside of a spacer plate 82. When the side die assemblies 28 are closed, the cut away portions of plates 80 and 82 define the lower receptacle 78. In the lower retaining plates 80 there is a relatively small central opening about the size of the lower end of the die cavity 36. In the upper spacer plates 82 there is a relatively large central opening that is appreciably larger than the lower end of the die cavity. As shown best in FIGURES 5 and 6, the cut away portion of the upper spacer plates 80 provides an annular retaining recess 84 between the retaining plates 80 below and the die sections 34 above.

The lower die assembly 24 of the illustrated die machine 20 includes a horizontal loading plate 90 proportioned to be received within the recess 84. Removably secured centrally of the upper surface of the loading plate 90 is a bottom plug 92 having a lower vertical cylindrical portion 94 and an upper conical portion 96. As shown best in FIGURES 5, 6 and 8, the bottom plug 92 is adapted to removably receive the lower end of the tubular workpiece 30 to horizontally support and locate the workpiece. The bottom plug 92 may be of circular cross-section or may be formed to preferentially shape the shock wave. The lower cylindrical portion 94 is grooved to receive an O-ring 100 which seals the lower end of the tubular workpiece 30 when it is mounted on the plug.

The loading plate 90 has a central bore 102 which communicates with a central passageway 104 through the bottom plug 92. As seen in FIGURE 5, the passageway 104 extends vertically upward into the center of the bottom plug 92 where it forks into a pair of channels 106 which emerge at opposite sides of the conical upper portion 96. The opening 102 in the loading plate 90 is connected to means, as will be explained more fully below, which visually indicate the liquid level in the workpiece 30, and which also drain the liquid from the interior of the tubular workpiece.

The upper die assembly 26 includes an upper block 110 of generally rectangular cross section which supports the electrode unit 32. The upper block 110 is movable vertically, as will be hereinafter described. The electrode unit 32, which is described in detail in patent application Ser. No. 397,961, filed concurrently herewith and assigned to the assignee of this application, includes an electrode holder 112 having a generally cylindrical upper neck portion 114 which flares outward to a flanged lower portion 116. The electrical connection means in the electrode holder 112 is potted in a casting of electrically insulating plastic resin. A pair of parallel electrodes 120 depend from the electrode holder 112. The electrode holder 112 is suitably detachably secured in the block 110 being inserted from the underside thereof.

The upper block 110 is formed with a central opening 122 therein to accommodate the electrode holder 112. An upper adapter 124 secured to the bottom face of the electrode holder 112, extends downward into the die cavity 36. The adapter 124 is generally cylindrical in shape, has a pair of vertically extending holes through which the electrodes 120 pass, and carries a suitable sealing O-ring 125 which is seated in a groove cut in its outer surface. Short insulating sleeves 126 insulate the electrodes 120 from the adapter. A liquid inlet passageway 127 in the adapter is aligned with a similar passageway (not shown) in the electrode holder 112 which is in communication with a liquid inlet (not shown) in the upper block 110 appropriately connected to a source of liquid.

As shown in the drawings, when the upper die assembly 26 is lowered to close the die construction 22, the upper adapter 124 interfits into the upper end of the tubular workpiece 30. The O-ring 125 provides a seal between the lateral surface of the adapter 124 and the inner surface of the workpiece. Liquid is fed into the interior of the tubular workpiece 30 through the inlet 127. A vent passageway (not shown) in the upper adapter 124 allows the air within the workpiece 30 to escape during filling with liquid.

The downward movement of the upper die assembly 26 is limited by physical stops. A stop plate 128 is secured to the upper surface of the upper block 110 so that it extends outwardly thereof to overlie the adjacent upper wall of the die holders 40 when they are closed. Suitable stops, such as depending set screws 130, in this overlying portion of the plate 128 permit adjustments in the downward travel of the upper die assembly 26 relative to the side die assemblies 28.

The illustrated electrode unit 32 utilizes a thin wire 131, such as a 40 to 60 mil diameter aluminum wire, attached across the lower ends of the electrodes 120 to facilitate discharge between the electrodes. This technique is sometimes referred to as the "exploding wire" technique because the wire 131 is destroyed when the high-voltage discharge occurs. Thus, a new piece of wire 131 must be positioned between the electrodes 120 for each forming operation when using this technique. If desired, an electrode unit (not shown) which operates with electrodes spaced closer together to obviate the need of a wire may be substituted for the illustrated electrode unit 32. This technique is sometimes referred to as the "spark" technique, wherein the high-voltage discharge jumps the gap between the lower ends of the electrodes.

The illustrated electrical energy storage unit 38 comprises a plurality of capacitor banks connected in parallel and means (not shown) for connecting them to an external source of electrical power. The energy storage unit 38 may be controlled to build up a preselected level electrical charge and to release this charge through the electrode unit 32. The illustrated unit 38 is designed for maximum storage of about 48 kilojoules and can be fully charged in less than 10 seconds. Circuitry (not shown) is provided so that some or all capacitor banks may be charged at one time to vary the strength of the electrical discharge.

As shown best in FIGURE 3, the apparatus 20 includes a pair of vertical side members or cabinets 136 which flank the die construction 22. The side members 136 house various components of the apparatus 20. The controls for the electrohydraulic forming operation are mounted on the forward panels of the cabinets 136. An upper panel 138 of each of the cabinets 136 is sloped downward to the rear (FIG. 2), and a generally rectangular, heavy steel backstrap structure 140 is secured to each upper panel 138. A pair of heavy cylindrical tie rods 142 connect the spaced backstrap structures 140 to support the movable side die assemblies 28, as will be explained more fully. The backstrap structures 140 also support hydraulic pressure means 144 for moving the side die assemblies 28. The tie rods 142 are spaced apart, with the upper tie rod extending between the upper forward ends of the backstrap structures 140 and the lower tie rod extending between the lower rearward ends thereof. This diagonal arrangement of the tie rods 142 affords firm and rigid support while providing ready access to the die cavity 36. Furthermore, it permits the forming of long workpieces on the illustrated apparatus 20.

As shown in FIGURE 4, each tie rod 142 has a reduced diameter portion at each end which provides a shoulder 146. These smaller diameter ends of the tie rods 142 extend through suitable aligned apertures in the inner and outer sidewalls of the backstrap structures 140. Nuts 148 on the threaded ends of the tie rods 142 secure the backstrap structures 140 against the shoulders 146 and provide a strong, firm structure for supporting the die construction 22. This strong, firm construction is particularly adapted to resist large, opposed, outward forces directed against the backstrap structures 140 incident to the clamping closed of the die construction 22.

Each of the die side assemblies 28 is slidably supported on the two tie rods 142. A pair of elongated tubular bushings 150 are slidably disposed on the upper tie rod 142. Each bushing 150 is secured to a surrounding split bushing housing 152. Each of the bushing housings 152 has a lower flange portion 154 which is secured to one of the die holders 40, as by screws 156 (FIG. 5). Thus, each bushing housing 152 and its associated die holder 40 are secured together over a fairly long adjacent surface to prevent front-to-back wobble or relative movement therebetween.

Secured along the rearward edge of the bottom wall of each die holder 40 is a follower or roller assembly 160 which guides and supports the die holder upon the lower rearward tie rod 142. Each follower assembly 160 includes a transversely extending upper mounting block 162. A pair of upper rollers 164 are rotatively mounted on horizontal shafts extending from the rear surface of each block 162. An extension block 166 is affixed beneath the forward section of each upper block 162 and supports a side roller 168 for rotation about a vertical axis. The rollers are positioned so that each die holder 40 is supported by a pair of spaced upper rollers 164 disposed for travel along the upper surface portion of the lower tie rod 142 and a transversely centered side roller 168 which travels along the forward surface portion of the tie rod. The die side assemblies 28 are thus mounted for movement between the closed position shown in FIGURE 6 and the fully open position. The side assemblies 28 are shown partially open in FIGURE 8.

Each die holder 40 is provided at its outer side surface with a coupler structure 170 which connects the die holder to the inner end of a transversely and inwardly extending piston rod 172 of a double-acting hydraulic cylinder 174 which is mounted on the backstrap structure 140 intermediate the two tie rods 142 and which is adapted to drive its associated die holder 40 either inward or outward. As shown in FIGURE 4, the coupler structure 170 permits some angular movement of the piston rod 172 relative to the adjacent outer side surface of the die holder 40. Each piston rod 172 is threaded externally at its inward end. The coupler structure 170 has mating internal threads which engage threads of the piston rod 172. Rotation of the coupler structure 170 permits relative motion of the die holder 40 and piston rod 172, and adjustment therebetween. Set screws (not shown) lock the coupler structure 170 to the piston rod 172 in the desired position. Each coupler structure 170 has an annular groove 176. A flange 178 fixed to each die holder 40 has an inwardly directed shoulder 178 which seat in the groove 176 of the coupler structure 170. The shoulder 178 bears against the groove 176 to move the die holder 40 outward when the hydraulic cylinder 174 is cycled to the die open position. A collar 181 may be placed on the piston rod 172 adjacent the coupler structure 170 to limit outward motion of the piston rod 182. A pad 180 of a relatively flexible resilient material is disposed between the inward end face of the piston rod 172 and the adjacent side of the die holder 40.

The hydraulic cylinders 174 are both connected through a control valve 183 to a suitable hydraulic pressure pump 182 that is supported inside one of the cabinets 136. Each of the hydraulic cylinders 174 is provided with pressure intensifier means, such as a high pressure air-operated piston-type hydraulic pump 184. One air-operated pump 184 is mounted on each backstrap structure 140 and connected to the hydraulic line which leads to the outer port of the adjacent cylinder 174, i.e. that port through which pressure is applied to extend the piston rod 172. The air-operated pumps 184 increase the pressure at the outer ends of the hydraulic cylinders 174 to produce a very large force against the extended piston rods 172. This arrangement creates intense supplementary clamping forces which close the die sections 34, in the nature of 110 tons or about 7,000 p.s.i.g. This prevents any appreciable gap from being produced between the die sections by the energy of the high-voltage discharge. A remotely operated, pneumatic stop valve 186 is located between the point where the air-operated pump 184 enters the hydraulic line and the control valve 183 to isolate the hydraulic pressure pump 182 from the intense supplementary pressures.

As best seen in FIGURES 2 and 3, two inner limit switches, a left-hand switch 190 and a right-hand switch 192, and two outer limit switches, a left-hand switch 194 and a right-hand switch 196, are mounted on part of the supporting frame of the apparatus that extends transversely between the backstraps 140 and generally to the rear of the die construction 22. Each die holder 40 is provided at its rear with an outwardly directed adjustable actuator 198 and an inwardly directed adjustable actuator 200. The inner limit switches 190 and 192 and the actuators 200 are positioned so that each switch is tripped when the associated die section 40 reaches its closed position. When both switches 190 and 192 are tripped, the pump 182 is stopped. Similiarly, the outer limit switches 194 and 196 and the actuators 198 are positioned so that each switch is tripped when the associated die section 40 reaches its fully open position and the pump 182 thereby stopped.

As best seen in FIGURES 2 and 3, the lower die assembly 24 is raised and lowered by a loading slide arrangement 206. The horizontal plate 90 is secured to the upper end of a vertical post 208 that is mounted at its lower end to a vertically adjustable slide 210, mounted for vertical travel along a vertically extending track 212. The track 212 is supported by generally rectangular, open, lower support 214 having a pair of front legs 216, generally aligned with the front panels of the side cabinets 136, and a pair of rear legs 218 generally aligned with the rear panels of the cabinets.

A pulley 220 is mounted on a bracket 222 on the rear upper end of the vertical track structure 212. A cord 224 extending over the pulley 220 is secured at one end to the movable slide 210 and at the other end to a free-hanging weight 226. The weight 226 serves to counterbalance the weight of the slide 210 and lower die assembly 24. An operating handle 228 for the lower die assembly is secured to the carriage 210. The illustrated handle 228 includes a forwardly extending rod 230 and a hand grip 232 secured to the forward end of the rod. The handle 228 is spring-loaded to normally lock the slide 210 against vertical movement. By turning the hand grip 232, a spring lock (not shown) is released to permit the lower die assembly 24 to be vertically adjusted as desired. When the hand grip 232 is released, the lower assembly 24 is automatically locked in position.

Connected to the central bore 102 in the plate 90 and extending downward therefrom is a fluid drain line 236 which includes a lower flexible drain tube 238 that extends downwardly into a drain pan 240. The drain pan 240 rests upon the floor which supports the apparatus 20 and extends between the spaced cabinets 136 and includes a drainage plug 242 adapted to be connected to the shop drainage system. The drain line 236 has a drain valve 244 between the drain tube 238 and the plate 90. A liquid-level gauge 246 is mounted on the inner side of the left-hand cabinet 136 at about the horizontal level of the upper end of the die cavity 36. A suitable conduit 248 connects the gauge 246 to the drain line 236 so that the liquid level in the die cavity 36 may be visually observed.

The upper die assembly 26 is mounted for vertical movement on a support arrangement 254 having a stationary base section 256 and a vertically movable upper section 258. The movable upper section 258 includes a generally horizontal elongated support channel 260 extending from front to back of the apparatus 20. The forward end of the channel 260 is screwed to the stop plate 128 of the upper die assembly 26, as by socket head screws 262. The upper end of the electrode unit 32 extends upwardly through an aperture in the web of the support channel 260.

As best seen in FIGURE 9, the rearward end of the channel 260 is secured at both sides to elongated vertical guide members 264. The vertical guide members 264 are slidably received in vertical guideways 266 defined by a housing portion 268 of the base section 256. The housing portion 268 is braced by a pair of outwardly extending, horizontal channel members 270 that are connected by screws 272, to the backstrap structure 140. Supported within the housing 268 is a vertically disposed pneumatic cylinder 274 which is connected by a piston rod 276 to the support channel 260. Actuation of the pneumatic cylinder 274 moves the upper section 258 vertically to raise and lower the upper die assembly 26 between the lowered position shown in FIGURE 5 and the elevated position. The upper die assembly 26 is shown partially elevated in FIGURE 2.

Three coaxial transmission cables 280 connect the energy storage unit 134 with the forming portion of the apparatus 20. The cables 280 are connected to the upper end of the electrode unit 32 through an electrode terminal assembly 282 which is described in detail in the aforesaid patent application Ser. No. 397,961. The cables 280 are sufficiently long to permit their upper ends to travel with the upper die assembly 26. The cables 280 are enclosed by front and rear covers 286 and 288, respectively, mounted on the upper section 258. The cables 280 are supported just rearward of their forward upper ends by an upper clamp 290 also mounted on the upper section 258. The lower rear ends of the cables 280 enter a connection box 294 which is mounted on the forwardmost wall of the energy storage unit 38.

Means are provided for locking the upper die assembly 26 in its lower or closed position. As best seen in FIGURE 6, the upper die block 110 is provided with oppositely disposed receptacles 300 in the side walls thereof. When the die construction 22 is closed, the receptacles 300 are aligned with horizontally extending plungers 302 slidably mounted in each of the die holders 40. Each of the plungers 302 is connected to and operated by an actuating mechanism 304 mounted on the outside of the die holder 40.

In the operation of the apparatus 20, briefly, the die assemblies 24, 26 and 28 close about the tubular workpiece 30 as shown in FIGURES 5, 6 and 7 with the electrodes 120 extending into the interior of the workpiece. The ends of the workpiece 30 are thereby sealed shut, and the interior of the workpiece is filled with a liquid, usually water. The air is removed from the toroidal space between the workpiece 30 and the die cavity 36. Then the forming cycle is initiated. The energy storage unit 38 is charged to a desired preset level and discharged through the electrode unit 32. A pressure impulse is produced and transmitted outwardly through the liquid to the workpiece 30, deforming it to the shape of the die cavity 36. The die assemblies 24, 26 and 28 are reopened (FIGURE 8), and the formed workpiece is removed. A new workpiece 30 is loaded, the wire 131 installed and the cycle is repeated.

Considering the operation in more detail, it is noted initially that the apparatus 20 may be operated in several different sequences. Because of the interengagement of the side die assemblies 28 with the lower die assembly 24, if the lower die assembly is lowered, it must be returned to its raised position prior to closing the side die assemblies 28. Similarly, in opening the die construction 22, it is necessary to withdraw the side die assemblies 28 before the lower die assembly 24 can be moved downward. On the other hand, the upper die assembly 26 may be raised or lowered independently of the side die assemblies 28, or of the lower die assembly 24, and thus may be moved either before or after withdrawal of the side die assemblies, so long as the plungers 302 have been withdrawn. It is only necessary that the side die assemblies 28 be open to release the formed workpiece and that either the upper die assembly 26 or the lower die assembly 24 be moved to separate the electrodes 120 from the tubular workpiece and permit the insertion of a new workpiece. Thus, it is possible to operate the apparatus 20 by moving the side die assemblies and the upper die assembly while the lower die assembly remains stationary, or by moving the side die assemblies and the lower die assembly while the upper die assembly remains stationary.

The preferred sequence of operation is as follows, beginning from the point in the cycle when the four die assemblies of the die construction 22 are open, with the lower die assembly 24 in the elevated position and a tubular workpiece 30 mounted on the bottom plug 92. The side die assemblies 28 are then closed by actuating the hydraulic cylinders 174 to clamp the die sections 34 around the tubular workpiece and secure the periphery of the plate 90 in the annular recess 84 to lock the lower assembly in the elevated position.

The operation of first closing the side die assemblies 28 and then exerting intense supplementary pressure to clamp the die sections 34 tightly together is of particular significance. Initially, the hydraulic pump 182 causes the hydraulic cylinders 174 to move the side die assemblies inward. The movement of the side die assemblies 28 is phased so that the left-hand die section (as seen in FIGURES 6 and 8) reaches its innermost position before the right-hand die section does. The left-hand hydraulic cylinder 174 is at its dead end position when the left-hand die section 40 reaches its innermost position. Thus, the right-hand die section moves against the left-hand die section to close the die construction, completing the die cavity 36 about the workpiece 30. Thus, the innermost position of the left-hand die section provides the reference or guide position at which the two die sections 34 meet. This initial closing of the die construction 22 is under a low pressure, about 100 p.s.i.g.

The inner actuator 200 (FIGURE 3) on the left-hand die assembly actuates the left-hand inner limit switch 190 when the left-hand die section reaches its innermost position. The inner actuator 200 on the right-hand die assembly actuates the right-hand inner limit switch 192 when the right-hand die section reaches its innermost position abutting the left-hand die section. When both of the inner limit switches 190 and 192 have been actuated, the stop valves 186 (FIGURE 4) are actuated, as are the high-pressure air-operated hydraulic pumps 184 associated with each of the hydraulic cylinders 174. These high pressure pumps 184 greatly increase the pressure of the hydraulic fluid in the head side of the cylinders 174 thus boosting the force exerted by the piston rods 172 to very large values. In the illustrated apparatus 20, a force in the order of 100 tons is exerted inward on each of the die sections 34.

The air-operated pump 184 on the left-hand side is regulated so that the force exerted on the left-hand die section is slightly greater than that exerted on the other die section to assure the cylinder remains at dead end. This is an important feature of the apparatus 20 and insures precise maintenance of the reference position of the die sections 34. This intense force prevents the die sections 34 from moving or separating any appreciable amount during the energy discharge of the forming operation which might result in a parting line on the finished workpiece or in other malformation of the product.

After a wire 131 is attached between the lower ends of the electrodes 120, the upper die assembly is lowered about 18 inches by retracting the vertical pneumatic cylinder 274 to the position shown in FIGURE 6 wherein the electrodes 120 extend centrally down into the workpiece 30 to a horizontal level approximately intermediate the height of the workpiece. Then, the mechanisms 304 move the plungers 302 inward to the position shown in FIGURE 6 interlocking the die side assemblies 28 with the upper assembly 26. The tubular workpiece 30 is now sealed at both ends, at its lower end by the O-ring 100 of the bottom plug 92 and at its upper end by the O-ring 125. Liquid, usually water, is then introduced into the interior of the workpiece 30 through the inlet 127 to substantially fill the workpiece and submerge the wire 131.

The vacuum pump 70 is operated to evacuate the air from the toroidal space between the outside of the tubular workpiece 30 and the inner surface of the die cavity, through the pipe 68. This vacuum facilitates the outward forming of the workpiece, i.e., eliminating any problem of air being trapped and pocketed by the rapid outward expansion of the workpiece and thereby impairing the precise and accurate formation of the outer surface of the workpiece. Also, the vacuum prevents possible oxidation from localized heating of small areas of the workpiece resulting from the rapid strain and displacement caused by the forming operation.

A desired high-voltage charge is built up in the energy storage unit 38 and then suddenly discharged, via the cables 280. A suitable circuit for accomplishing the charge and discharge is described in detail in patent application, Ser. No. 397,971, entitled "Control Circuit," filed concurrently herewith in the name of Richard A. Ayers, and assigned to the assignee of this application. The discharge between the submerged electrodes 120 explodes the wire 131 and provides a high energy impulse which is transmitted outward through the liquid to the workpiece, forcing it outward and deforming it to the shape of the die cavity 36.

The liquid then drains from the interior of the formed workpiece by opening the drain valve 244 to allow it to flow through the drain tube 238 into the drain pan 240. The air-operated pumps 184 are de-activated and the stop valves 186 are opened to release the intense pressure. The side die assemblies 28 are separated by stepping the control valve 183 so that when the pump 182 is started, fluid pressure is applied to the inner ports of the double-acting cylinders 174 and the piston rods 172 are retracted. The upper die assembly 26 is elevated so the workpiece which has been formed into the desired product may be lifted off the bottom plug 92 and a new workpiece loaded thereon. A new wire 131 is attached between the electrodes 120, and the cycle described above is repeated to form another workpiece. The steps of forming operation including the die closing, clamping, electrical discharge and reopening are ordinarily accomplished in less than 15 seconds with the illustrated apparatus 20. Including the time for manual loading and unloading, the apparatus may be conveniently operated to form about 2 work pieces per minute.

If, for some particular difficult metal to form, it is desirable to apply more than one impulse to a particular workpiece, the upper die assembly 26 is unlocked and raised without opening the side die assemblies 28. A new wire 131 is attached between the electrodes 120, and the upper die assembly 26 is lowered and locked in position for another high-voltage discharge.

The illustrated apparatus 20 is provided with a series of interlocks which prevent a discharge from occuring across the electrodes 120 unless the two side die assemblies 28 are closed, intense pressure is being applied to clamp the die sections 34 together, and the upper die assembly 26 is lowered and locked in place by the extended plungers 302. No interlock is provided for the lower die assembly 24 because when long tubular workpieces are formed, as will be explained below, the lower die assembly is not utilized.

For the forming of a small diameter tubular workpiece 30a, for example having a diameter in the order of ¾ inch or smaller, the apparatus 20 is preferably adapted as shown in FIGURE 10. Die halves or sections 34a defining a suitably smaller die cavity 36a are employed. The fluid drain line 236 is removed, and a suitably smaller bottom plug 92a is used. Because of the limited space within the narrow workpiece 30a, an electrode unit 32a that has a single electrode 120a is substituted for the unit 32.

The upper die assembly 26 is lowered to forming position, and a triggering wire 131a is attached to the lower end of the electrode 120a so that it extends downward therefrom. The bottom plug 92a is made of electrically conductive material and has an upwardly open central receptacle 312 therein which is adapted to receive and electrically connect with the lower end of the triggering wire 131a when the lower die assembly is raised into forming position (FIGURE 10). A cable 314 connects the bottom plug 92a to the appropriate portion of the electrode unit 32a so that a high-voltage discharge can take place between the electrode 120a and the plug 92a, exploding the wire 131a.

In operation, after the triggering wire 131a is clamped to the electrode 120a, the slide 210 (FIGURE 2) is then lowered, and the small workpiece 30a is placed in position on the bottom plug 92a. The workpiece 30a is then filled with liquid, usually water, using the manual hose (not shown). The slide 210 is then raised to the loaded position wherein the triggering wire 131a completes the electrical discharge circuit between the electrode 120a and the bottom plug 92a. The slide die assemblies 28 are then closed and clamped, and the energy storage unit 38 is charged and fired, thus forming the small tube into the die cavity 36a. The die side assemblies 28 are opened, the slide 210 lowered, and the small tube removed with its bottom plug 92a. The liquid remaining in the small workpiece 30a is emptied into the drain pan 240 at the bottom of the apparatus 20. This procedure is then repeated for the next workpiece 30a.

The apparatus 20 is adapted as shown in FIGURE 11 for forming a long tubular workpiece 30b, from 12 inches to about 42 inches in length. When the die construction 22 is closed, the upper end of the long workpiece 30b lies within the die cavity 36, and the remainder of the workpiece extends downwardly as permitted by the removal of the lower retaining plates 80 from the die holders 40. The loading plate 90 and the loading slide arrangement 206 are also removed.

A bottom plug 92b, mounted at the upper end of an elongated bottom plug extension 320, is positioned in the workpiece 30b spaced the desired distance from the upper end of the workpiece. The lower end of the workpiece rests on an annular flange 321 near the lower end of the extension 320. The extension 320 is removably supported on a jack 322 which is placed on the lower support 214 of the apparatus. The jack 322 is adjusted to position the bottom plug 92b at approximately the horizontal level of the lower end of the die cavity 36. The bottom plug 92b carries an O-ring 100b to seal the lower end of the section of the long tubular workpiece 30b that is to be formed. The upper end of the workpiece 30b is sealed as described above, by O-ring 125 carried by the adapter 124.

In operation, with the upper die assembly 26 raised, the bottom plug 92b and its extension 320 are located within the workpiece 30b, and this unit is removably supported on the jack 322. The side die assemblies 28 are closed and clamped.

The workpiece 30b is then manually filled with liquid, filling from the top. After attaching the trigger wire 131 between the electrodes 120, the upper die assembly 26 is lowered into position and locked. The energy storage unit 38 is then charged to the selected energy capacity and discharged into the workpiece. The side die assemblies 28 are then opened, and the upper die assembly 26 is raised. The workpiece that has been formed is taken off the jack 322 and the liquid in the workpiece is poured into the drain pan 240. The bottom plug extension 320 and the bottom plug 92b are now removed from the workpiece. The process is repeated for forming other workpieces.

The apparatus 20 is adapted as shown schematically in FIGURE 12 to form a generally flat workpiece 30c. The die sections 34 and the die inserts 44 are replaced by a large left-hand die portion 330 and a smaller right-hand die portion 332, which meet along a vertical plane offset to the right of the center of the die construction 22. The flat workpiece 30c is clamped along its periphery between the two die portions 330 and 332 and is disposed in that vertical plane at which the die portions meet. The smaller right-hand die portion 332 provides a die cavity 36c of the shape into which it is desired to form the workpiece 30c. The left-hand die portion 330 provides an electrical discharge chamber 334 horizontally aligned with the die cavity 36c but on the opposite side of the workpiece 30c. The larger die portion 330 has a vertical opening 336 leading into the discharge chamber 334 from above, through which the electrodes 120c of an electrode unit 32c extend. One electrode 120c is shorter than the other so the wire 131c is disposed at an angle.

The larger die portion 330 is also provided with a liquid outlet passageway 338 which leads to the drain line 236 in the plate 90. Passageways 68c are provided in the right-hand die portion 332 leading from the die cavity 36c to the vacuum pump 70 so that the space between the supported flat workpiece 30c and the inner surface of the die cavity can be evacuated. A suitable liquid fill line and vent 340 is provided in the left-hand die portion 330.

The operation is similar to that described with respect to the forming of the workpiece 30. An electrical discharge which explodes the wire 131c between the electrodes 120c creates shock waves in the liquid in the chamber 334, the angular disposition of the wire 131c directing the waves toward the workpiece 30c. The intermediate portion of the flat workpiece 30c is deformed to the right so that it takes the shape of the die cavity 36c. The intense supplemental pressure applied on the two die portions 330 and 332 serves, in this application of the apparatus 20, to prevent undesirable shifting or movement of the workpiece 30c, as might result if any appreciable separation of the die portions were to occur incident to the discharge forming operation.

If desired, instead of moving both die portions, the larger left-hand die portion 330 may be held stationary and only the right-hand die portion 332 moved to and from it. It is also noted that the wedge configuration, as viewed in frontal section, of the discharge chamber 334 assists the angularly disposed wire 131c in directing and focusing the shock waves produced by the electrical discharge against the flat workpiece 30c for efficient use of the energy.

In summary, the electrohydraulic forming apparatus 20 rapidly and automatically positions the workpiece in the precise desired location relative to the die cavity and to the electrical discharge means. Without interrupting this relative positioning, the apparatus 20 exerts an intense supplementary clamping force on the die construction 22 to prevent any appreciable separation or relative movement between the die sections 40 or between the workpiece 30 and the die sections 40. This consistently results in precision work. Tolerances of finished products can be held to extremely low values and are reproducible over long production runs. Moreover, the apparatus 20 easily performs operations which are quite difficult to accomplish with conventional equipment.

The apparatus 20 has great flexibility as to the types of workpieces which it can form, being easily adapted to form either tubular or flat workpieces, as well as workpieces of substantial length. The apparatus 20 is constructed so that the die cavity and the workpiece are readily accessible to the operator. In addition, the apparatus 20 minimizes die costs and is itself relatively simple and inexpensive while being efficient, dependable and durable.

The illustrated structure presents a preferred form of the broad invention as defined by the claims. For example, as noted above, the shape and size of workpieces and die cavities may be varied. Furthermore, a variety of different electrical discharge means, energy storage means, and sources of electrical power may be utilized. Various other changes and modifications in the illustrated structure may obviously be made without departing from the spirit and scope of the present invention.

Various features of the present invention are set forth in the following claims.

What is claimed is:

1. Apparatus for electrohydraulic forming which comprises first and second opposed die sections movable toward and away from each other, said die sections defining a die cavity therebetween, means for introducing liquid into said die cavity, means for controlling the movement of said die sections, said control means being operable to move said first die section inward to a reference position and to move said second die section inward to meet said first die section at said reference position, said control means also being operable to apply a first intense supplementary inward force to said first die section and a second intense supplementary inward force to said second die section, said first force being greater than said second force, means for positioning a workpiece in said cavity, and means for positioning an electrical discharge unit at a predetermined position in said cavity, whereby a workpiece is precisely positioned in said die cavity and undesired shifting between the die sections themselves or between the die sections and the workpiece incident to electrical discharge is prevented.

2. In apparatus for electrohydraulic forming, first and second opposed die sections movable toward and away from each other, said die sections defining a die cavity therebetween, means for controlling the movement of said die sections, said control means being operable to move said first die section inward to a reference position and to move said second die section inward to meet said first die section at said reference position, said control means then applying a first intense supplementary inward force to said first die section and a second intense supplementary inward force to said second die section, said first force being greater than said second force.

3. In apparatus for electrohydraulic forming first and second opposed die sections movable toward and away from each other, said die sections defining a die cavity therebetween, a hydraulic cylinder connected to said first die section, means for controlling the movement of said die sections, said control means being operable to actuate said hydraulic cylinder and move said first die section inward to a reference position at the dead end of said cylinder and to move said second die section inward to meet said first die section at said reference position, said control means then applying a first intense supplementary inward force to said first die section and a second intense supplementary inward force to said second die section, said first force being greater than said second force.

4. Apparatus for electrohydraulic forming comprising first and second opposed die sections movable toward and away from each other, said die sections defining a die cavity therebetween, means for introducing liquid into said die cavity, means for controlling the movement of said die sections, said control means being operable to move said first side die section inward to a reference position and to move said second die section inward to meet said first side section at said reference position, said control means being operable to apply a greater inward pressure to said first die section than to said second die section, means for positioning a workpiece in said cavity in a predetermined position with regard to said reference position of said first die section, and means for positioning an electrical discharge unit in a predetermined position in said cavity, whereby the workpiece and the electrical discharge unit are precisely located relative to the die cavity.

5. Apparatus for electrohydraulic forming comprising first and second opposed die sections movable toward and away from each other, said die sections defining a die cavity therebetween, means for introducing liquid into said die cavity, means for controlling the movement of said die sections, said control means being operable to move said first side die section inward to a reference position and to move said second die section inward to meet said first side section at said reference position, said die sections being moved in a manner such that said first die section reaches said inward reference position before said second die section meets said first die section, said control means also being operable to automatically apply a first intense supplementary inward pressure to said first die section and a second intense supplementary inward pressure to said second die section after said die sections reach said inward positions, said firt supplementary pressure being greater than said second supplementary pressure, means for positioning a workpiece in said cavity in a predetermined position with regard to said reference position of said first die section, and means for positioning an electrical discharge unit in said cavity in a predetermined position with regard to said reference position of said first die section, whereby the workpiece and the electrical discharge unit are precisely located relative to the die cavity and any appreciable shifting between the die sections themselves or between the die sections and the workpiece incident to the electrical discharge is prevented.

6. Apparatus for electrohydraulic forming comprising a frame, first and second opposed die sections mounted on said frame for generally horizontal movement toward and away from each other, said die sections defining a die cavity therebetween, means for introducing liquid into said die cavity, hydraulic pressure means on said frame for controlling the movement of said die sections, said hydraulic pressure means being operable to move said first die section inward to a reference position and to move said second die section inwardly to meet the said first die section at said reference position, said movement being such that said first die section reaches said inward reference position before said second die section meets said first die section, said hydraulic pressure means also being operable to automatically apply a first intense supplementary inward pressure to said first die section and a second intense supplementary inward pressure to said second die section after said die sections meet, said first supplementary pressure being greater than said second supplementary pressure, loading means mounted on said frame for generally vertical movement to position a workpiece in said cavity in a predetermined position with regard to said reference position of said first die section, and electrical discharge means mounted on said frame for generally vertical movement to position an electrical discharge unit in said cavity in a predetermined position with regard to said reference position of said first die section, whereby the workpiece and the electrical discharge unit are precisely located within said die cavity and any appreciable shifting between the die sections themselves or between the die sections and the workpiece, incident to the electrical discharge, is prevented.

7. Apparatus for electrohydraulic forming by submerged, high-energy, electrical discharge, which apparatus comprises a frame including a pair of spaced vertical side posts, upper and lower tie bars connected generally horizontally between said posts, said lower tie bar being located substantially rearwardly of said upper tie bar to afford ready access to the area between said side posts and said tie bars, a pair of opposed die sections each mounted on said tie bars for generally horizontal movement toward and away from each other, said die sections defining a die cavity therebetween which is open from above and from below, a lower die assembly mounted on said frame generally below said die sections for positioning a workpiece within said die cavity, an upper die assembly mounted on said frame generally above said die sections for positioning an electrical discharge unit within said die cavity, and means for introducing liquid into said die cavity.

8. Apparatus for electrohydraulic forming by submerged, high-energy, electrical discharge, which apparatus comprises a frame including a pair of spaced vertical side posts, upper and lower tie bars connnected generally horizontally between said posts, said lower tie bar being located substantially rearwardly of said upper tie bar to afford ready access to the area between said side posts and said tie bars, first and second opposed die sections mounted on said tie bars for generally horizontal movement toward and away from each other, said die sections defining a die cavity therebetween which is open from above and from below, means for introducing liquid into said die cavity, means for controlling the movement of said die sections, said control means being operable to move said first die section inward to a reference position and to move said second die section inward to meet said first die section at said reference position, said control means also being operable to apply a first intense supplementary inward pressure to said first die section and a second intense supplementary inward pressure to said second die section, said first supplementary intense pressure being greater than said second intense supplementary pressure, a lower die assembly mounted on said frame below said die sections for positioning a workpiece in said die cavity in predetermined spacial relation to said reference position, and an upper die assembly mounted on said frame generally above said die sections for positioning an electrical discharge unit within said die cavity.

9. Apparatus for electrohydraulic forming of a workpiece, which apparatus comprises a frame, a pair of opposed die sections mounted on said frame for generally horizontal movement toward and away from each other, said die sections defining therebetween a vertically extending die cavity that is open from above and from below, a lower die assembly mounted on said frame below said die sections for generally vertical movement and including means for removably supporting a tubular workpiece so that it extends vertically and is aligned with said die cavity, said lower die assembly being movable between a closed upper position where the workpiece is disposed within said die cavity and an open lower position where the workpiece is outside said cavity, said lower die assembly including means adapted to seal the interior of the lower end of the workpiece when it is supported on said lower die assembly, an upper die assembly mounted on said frame above said die sections for generally vertical movement and including a downwardly extending electrode unit vertically aligned with said die cavity, said upper die assembly being movable vertically between a closed lower position where the electrode unit is disposed within said die cavity and an open upper position where said electrode unit is outside and above said die cavity, said electrode unit being adapted to extend into a predetermined position in the tubular workpiece when both said die assemblies are in their closed positions, said upper die assembly including means adapted to seal the upper end of the workpiece when both said assemblies are in their closed positions, means for introducing liquid into the interior of the sealed workpiece, and means for creating a vacuum between said die cavity and the outside of the workpiece.

10. Apparatus for electrohydraulic forming of a workpiece, which apparatus comprises first and second opposed die sections adapted for inward movement toward each other and outward movement away from each other, said die sections defining therebetween a die cavity having at least one opening therein, a hydraulic cylinder connected to said first die section, means connected to said second die section for effecting the movement thereof, means for controlling the movement of said die sections, said control means being operable to actuate said hydraulic cylinder to move said first die section inward to a reference position at the dead end of said cylinder and to move said second die section inward to meet said first die section at said reference position, high pressure pneumatic means for actuation by said control means after said die sections have reached said reference positions to apply a first intense inward force to said first die section and a second intense inward force to said second die section, said first force being greater than said second force, means for insertion through said opening to position an electrical discharge unit at a predetermined position in said cavity, and means for introducing liquid into said cavity.

11. Apparatus for electrohydraulic forming of a workpiece, which apparatus comprises a frame, a first and second opposed die sections mounted on said frame for generally horizontal movement toward and away from each other, said die sections defining therebetween a vertically extending die cavity that is open from above and from below, a hydraulic cylinder connected to said first die section, means connected to said second die section for effecting the movement thereof, means for controlling the movement of said die sections, said control means being operable to actuate said hydraulic cylinder to move said first die section inward to a reference position at the dead end of said cylinder and to move said second die section inward to meet said first die section at said reference position, high pressure means then actuated by said control means to apply a first intense supplementary inward force to said first die section and a second intense supplementary inward force to said second die section, said first force being greater than said second force, a lower die assembly mounted on said frame below said die sections for generally vertical movement and including means for removably supporting a tubular workpiece so that it extends vertically and is aligned with said die cavity, said lower die assembly being movable between a closed upper position where the workpiece is disposed within said die cavity and an open lower position where the workpiece is below said cavity, said lower die assembly including means adapted to seal the interior of the lower end of the workpiece when it is supported on said lower die assembly, an upper die assembly mounted on said frame above said die sections for generally vertical movement and including a downwardly extending electrode unit vertically aligned with said die cavity, said upper die assembly being movable between a closed lower position where the electrode unit is disposed within said die cavity and an open upper position where said electrode unit is outside said die cavity, said electrode unit being adapted to extend into a predetermined position in the tubular workpiece when both said die assemblies are in their closed positions, said upper die assembly including means adapted to seal the upper end of the workpiece when both said assemblies are in their closed positions, means for introducing liquid into the interior of the sealed workpiece, and means for creating a vacuum between said die cavity and the outside of the workpiece.

12. Apparatus for electrohydraulic forming which comprises a die including a pair of movable opposed first and second die sections, said die sections defining a cavity, means for positioning a workpiece in desired alignment within said cavity and to thereby divide said cavity into a die portion and a discharge chamber, said discharge chamber being adapted to be filled with liquid, means for creating an electrical discharge within said discharge chamber, and control means for moving said pair of opposed die sections toward and away from each other along a straight line, which control means is operable to move said first die section inward to a reference position and to move said second die section inward to meet said first die section at said reference position.

13. Apparatus in accordance with claim 12 wherein said control means is also operable to apply a first intense supplementary inward force to said first die section and to apply a second intense supplementary inward force to said second die section, said first force being greater than said second force.

References Cited
UNITED STATES PATENTS

| | | | |
|---|---|---|---|
| 3,188,844 | 6/1965 | Schwinghamer | 72—56 |
| 3,222,902 | 12/1965 | Brejcha et al. | 72—56 |
| 3,232,085 | 2/1966 | Inoue | 72—56 |
| 3,252,312 | 5/1966 | Maier | 72—56 |

OTHER REFERENCES

The Tool Engineer: Hydrospark Forming, by U. Frederich Parr pp. 81–82; March 1960.

RICHARD J. HERBST, *Primary Examiner.*